United States Patent
Conrad

(10) Patent No.: US 7,228,593 B2
(45) Date of Patent: Jun. 12, 2007

(54) APPLIANCE WHICH UTILIZES A MAGNETIC CLUTCH TO TRANSMIT POWER FROM A DRIVE MEANS TO A MOVABLE MEMBER AND A MAGNETIC CLUTCH

(75) Inventor: Wayne Ernest Conrad, Hampton (CA)

(73) Assignee: Polar Light Limited, Tai Po, N. T. (HK)

( * ) Notice: Subject to any disclaimer, the term of this patent is extended or adjusted under 35 U.S.C. 154(b) by 507 days.

(21) Appl. No.: 10/417,234

(22) Filed: Apr. 17, 2003

(65) Prior Publication Data

US 2003/0196294 A1 Oct. 23, 2003

(30) Foreign Application Priority Data

Apr. 18, 2002 (CA) .................................. 2382269

(51) Int. Cl.
*A47L 9/04* (2006.01)
(52) U.S. Cl. ............................ 15/390; 15/52.1; 15/389
(58) Field of Classification Search .................. 15/351, 15/389, 390, 352, 41.1, 52.1; 310/103, 152; 464/29

See application file for complete search history.

(56) References Cited

U.S. PATENT DOCUMENTS

| | | | |
|---|---|---|---|
| 3,361,215 A * | 1/1968 | Gayle | 310/103 |
| 4,065,234 A | 12/1977 | Yoshiyuki et al. | |
| 4,092,512 A * | 5/1978 | Suzuki et al. | 310/103 |
| 4,099,291 A | 7/1978 | Bowerman | |
| 4,163,164 A | 7/1979 | Pieters | |
| 4,235,321 A | 11/1980 | Stein | |
| 4,317,253 A | 3/1982 | Gut et al. | |
| 4,660,247 A | 4/1987 | Frohibieter et al. | |
| 5,105,928 A | 4/1992 | Saeki et al. | |
| 5,168,599 A | 12/1992 | Williams | |
| 5,713,405 A | 2/1998 | Kashiwagi | |
| 5,839,160 A | 11/1998 | Wang et al. | |
| 6,054,788 A | 4/2000 | Dombrovski et al. | |
| 6,129,193 A | 10/2000 | Link | |

FOREIGN PATENT DOCUMENTS

| | | |
|---|---|---|
| DE | 3631526 A1 | 3/1988 |
| FR | 2391393 | 12/1978 |
| SU | 1300227 A1 | 3/1987 |

\* cited by examiner

*Primary Examiner*—Theresa T. Snider
(74) *Attorney, Agent, or Firm*—Philip C. Mendes da Cost; Bereskin & Parr

(57) ABSTRACT

An appliance comprises a moving member, a drive motor, and a linkage drivingly connecting the drive motor to the moving member, the linkage including first and second magnetic coupling members The magnetic clutch may have first and second magnetic coupling members. Each magnetic coupling member has a first surface, which includes at least first and second magnets. Each of the first and second magnets have an outer pole and the outer poles of each of the first magnets and the outer poles of each of the second magnets are of reverse polarity, wherein at least one of the first and second magnetic coupling members is moveably mounted with respect to the other of the first and second magnetic coupling members in a direction perpendicular to the first faces.

49 Claims, 14 Drawing Sheets

APPLIANCE WHICH UTILIZES A MAGNETIC CLUTCH TO TRANSMIT POWER FROM A DRIVE MEANS TO A MOVABLE MEMBER AND A MAGNETIC CLUTCH

FIELD OF THE INVENTION

This invention relates to the transmission of mechanical power from a source of motive force, such as an electric motor, to a movably mounted member. In one aspect, this invention relates to household appliances such as vacuum cleaners, power tools and garden tools which utilize a magnetic clutch for transmitting force from a motor to a rotary brush, cutting member or the like. In another aspect, this invention relates to an improved design for a magnetic clutch.

BACKGROUND OF THE INVENTION

It is known in the surface cleaning art to utilize a rotating or oscillating brush to assist in removing dirt from a surface to be cleaned and transporting the dirt into a surface cleaning head of a vacuum cleaner, sweeper or the like. A rotary brush may be powered by an electric motor or an air turbine which may be drivingly connected to the brush by means of a fan belt or by directly mounting the brush on the shaft of the motor or air turbine so as to directly drive the brush from the electric motor or air turbine.

A rotary brush may occasionally become entangled with foreign objects, such as the fringes of an area rug, which cause the rotary brush to slow down or stop altogether. In such cases, the foreign object may be damaged by the strain applied to the object by the rotating brush when the brush becomes jammed. Alternately, or in addition, the motor drive means for the rotary brush may become damaged (the motor could overheat by drawing an excessive current due to the brush jam condition).

In some surface cleaning appliances, a rotary brush does not have a device to stop the brush rotating if the brush becomes jammed. However, mechanisms to terminate the rotation of a brush when a brush jam condition occurs are known. For example, it is known to use an electric circuit to monitor the current drawn up by an electric brush motor. When the brush becomes jammed, the current drawn by the brush motor increases. The circuit senses the rise in current drawn by the motor. The circuit may be programmed such that, upon a predetermined current rise, the brush motor is de-energized. Thus, the user is advised that the brush is jammed and may then clear the brush jam. One disadvantage to this approach is that additional electronics must be incorporated into a suction cleaner to monitor the current rise. This increases the cost of the surface cleaning appliance. In addition, due to the prevalence of dust and debris which enters the surface cleaning head, the electronics may become damaged or may malfunction. In addition, such a sensing circuit may not be used if the brush is driven by an air turbine.

SUMMARY OF THE INVENTION

In accordance with one aspect of the instant invention, a magnetic clutch is utilized in the power transmission coupling between a brush motor and a brush. The magnetic clutch comprises two elements (e.g. opposed plates), which are provided with magnets. Attractive forces between the magnets on the opposed plates will magnetically couple the plates together. Accordingly, the rotation of one plate will cause the other plate to rotate. However, as the plates are not physically connected, if a predetermined amount of torque is applied to one of the plates (e.g. the brush of a vacuum cleaner becomes jammed), the plates will become magnetically decoupled. Accordingly, continued rotation of one of the plates will not cause the opposed plate to rotate thus preventing damage to the brush, any object entangled in the brush as well as the brush motor.

In accordance with another aspect of the instant invention, a magnetic clutch is used as part or all of the power transmission system between a drive means of an appliance and a moving member that is driven by the drive means. For example, the appliance could be a lawnmower wherein the drive means is the motor of the lawn mower and the moving member, which is driven by the motor, is the cutting blade of the lawn mower. Pursuant to such an embodiment, if the lawn mower blade strikes a solid object (e.g. a rock), the blade will cease rotating due to the disks of the magnetic clutch becoming magnetically decoupled. Similarly, the appliance could be an edge trimmer, a hedge trimmer or other garden implement. In addition, the appliance could be a power tool such as a drill, a skill saw, a jigsaw, a sander or the like. For example, in the case of a drill, the drive means could be the motor of the power tool. The moving member, which is driven by the drive means, could be the chuck in which a drill bit is mounted. According to such an embodiment, if more than a predetermined amount of torque is applied to the drill bit when a hole is being drilled in an object, then the chuck could become magnetically decoupled from the drive motor of the drill thereby preventing damage to the drill bit or overheating of the motor of the drill.

One advantage of the use of a magnetic clutch in an appliance, such as a vacuum cleaner, garden tool or power tool, is that the movement or rotation of a rotary brush, cutting blade or the reciprocating movement of the blade of a jig saw may be stopped if the moving member becomes jammed or if an excessive restraining force is applied to the moving member without the need of an electric circuit to monitor the current drawn by an electric motor.

A further advantage is that a magnetic clutch may be employed if the drive means is not an electric motor. For example, the drive means could be an air turbine in the case of a vacuum cleaner or a pneumatic air feed in the case of a power tool. The use of a magnetic clutch does not require monitoring the condition of an electric motor and accordingly may be used regardless of the power source which is utilized to drive the moving member.

By adjusting the attractive force between the opposed magnets of the magnetic clutch, the amount of torque which is required to magnetically decouple the clutch and accordingly stop the moving member may be adjusted. Thus, the magnetic clutch could be designed to become magnetically decoupled at a predetermined level at which neither the moving member nor the appliance is damaged.

In accordance with another embodiment of the instant invention, an improved magnetic clutch is disclosed. Pursuant to such an embodiment, the clutch comprises opposed elements each of which contains at least two magnets, the outer poles of which are of opposed or reverse polarity so that, in one orientation, the opposed elements will be magnetically attracted to each other (i.e. magnetically coupled) and, in a second orientation, the opposed elements will be magnetically repelled from each other (i.e. magnetically decoupled). One of the plates is non-rotatably mounted to a shaft (e.g. the shaft of a drive motor). The other of the plates is freely rotatably mounted on a shaft. Accordingly, the opposed plate will only rotate if it is magnetically coupled to the first plate. At lease one of the plates is mounted for lateral motion away from the other plate (e.g. it may be slidably mounted on a shaft). Accordingly, if the plates become magnetically decoupled, the repulsive forces between opposed magnets will cause the plate that is slidably mounted on the shaft to move away from the other opposed plate. If the plates are maintained in closed proximate relationship when they are magnetically decoupled, the induced eddy currents caused by the relative rotation of one plate with respect to the other will result in heating of the magnets provided in the plates. Excessive heating can damage the magnets. An advantage of the embodiment according to this aspect of the invention is that the separation of the magnets, due to the separation of the opposed plates due to the repulsive forces between the magnets on the opposed plates when the plates become magnetically decoupled, reduces the induced heating of the magnets due to the continued rotation of one of the plates with respect to the other when the plates become magnetically decoupled.

In accordance with one aspect of the instant invention, there is provided a surface cleaning head for a surface cleaning apparatus comprising:
 (a) a bottom surface having a dirt inlet;
 (b) a rotatable brush associated with the dirt inlet;
 (c) a brush drive motor; and,
 (d) a linkage drivingly connecting the motor to the rotatable brush, the linkage including first and second magnetic coupling members.

In one embodiment, each magnetic coupling member has
 (a) a first surface which includes at least first and second magnets; and,
 (b) each of the first and second magnets have an outer pole and the outer poles of each of the first magnets and the outer poles of each of the second magnets are of reverse polarity, wherein at least one of the first and second magnetic coupling members is moveably mounted with respect to the other of the first and second magnetic coupling members in a direction perpendicular to the first faces.

In another embodiment, each magnetic coupling member is provided with a sufficient number of first and second magnets such that the first magnets of the first coupling member can align with the second magnets of the second coupling member and the second magnets of the first coupling member can align with the first magnets of the second coupling member.

In another embodiment, the first magnetic coupling member has a similar number of first magnets as the second magnetic coupling member and the first magnetic coupling member has a similar number of second magnets as the second magnetic coupling member.

In another embodiment, each magnetic coupling member has at least two first magnets and at least two second magnets and the first and second magnets are positioned such that at least some of the first magnets are positioned between some of the second magnets.

In another embodiment, the first and second magnets are spaced apart in at least one line around the first face of each magnetic coupling member and positioned in each line such that outer poles of one polarity are positioned between outer poles of the reverse polarity.

In another embodiment, each of the magnetic coupling members is mounted on a common shaft and the first magnetic coupling member is mounted to the shaft to rotate with the shaft and the second magnetic coupling member is freely rotatably positioned on the shaft.

In another embodiment, the brush drive motor has a brush drive motor shaft, the magnetic coupling members are provided on the brush motor shaft and the second magnetic coupling member is drivingly connected to the brush by a fan belt.

In another embodiment, each of the magnetic coupling members is mounted on the brush and the first magnetic coupling member is mounted to the brush to rotate with the brush and the second magnetic coupling member is freely rotatably positioned on the brush and drivenly connected to the brush drive motor by a fan belt.

In another embodiment, the surface cleaning head further comprises a brake member which is engagable with at least one of the brush and the linkage to apply torque to the at least one of the brush and the linkage. The brake member may be manually engagable by a user. Alternately, the surface cleaning head may further comprise an extension hose which is removable from a storage position for above floor cleaning and the brake member is automatically engaged when the hose is removed from the storage position In accordance with one aspect of the instant invention, there is provided a surface cleaning head for a surface cleaning apparatus comprising:
 (a) a bottom surface having dirt inlet means;
 (b) rotatable brush means associated with the dirt inlet means;
 (c) brush drive motor means; and,
 (d) linkage means for drivingly connecting the motor to the rotatable brush means, the linkage including first and second magnetic means for releasably drivingly coupling the first magnetic coupling means to the second magnetic coupling means.

In one embodiment, each of the first and second magnetic coupling means includes magnet means that, in a first orientation, magnetically couple the magnetic coupling means such that rotation of the first magnetic coupling means will cause rotation of the second magnetic coupling means and, in a second orientation, the first and second magnetic coupling means will magnetically repel each other.

In another embodiment, at least one of the first and second magnetic coupling means is moveably mounted with respect to the other of the first and second magnetic means such that when the magnet means are in the second orientation, the magnetic coupling means will move apart.

In another embodiment, each of the magnetic coupling means is mounted on a common shaft and the first magnetic coupling means is mounted to the shaft to rotate with the shaft and the second magnetic coupling means is freely rotatably positioned on the shaft.

In another embodiment, the brush drive motor means has a brush drive motor shaft, the magnetic coupling means are mounted on the brush drive motor shaft and the second magnetic coupling means is drivingly connected to the brush means by a fan belt.

In another embodiment, each of the magnetic coupling means is mounted on the brush means and the first magnetic coupling means is mounted to the brush means to rotate with the brush means and the second magnetic coupling means is drivenly connected to the brush drive motor means by a fan belt.

In another embodiment, the surface cleaning head further comprises brake means for applying torque to at least one of the magnetic coupling means to cause the magnet means to move to the second orientation. The brake means may be manually engagable by a user. Alternately, the surface cleaning head may further comprise an extension hose, which is removable from a storage position for above floor cleaning and the brake means is automatically engaged when the hose is removed from the storage position.

In accordance with another aspect of the instant invention, there is provided a magnetic clutch comprising first and second magnetic coupling members each magnetic coupling member comprising:

(a) a first surface which includes at least first and second magnets; and, (b) each of the first and second magnets have an outer pole and the outer poles of each of the first magnets and the outer poles of each of the second magnets are of reverse polarity, wherein at least one of the first and second magnetic coupling members is moveably mounted with respect to the other of the first and second magnetic coupling members in a direction perpendicular to the first faces.

In one embodiment, each magnetic coupling member is provided with a sufficient number of first and second magnets such that the first magnets of the first coupling member can align with the second magnets of the second coupling member and the second magnets of the first coupling member can align with the first magnets of the second coupling member.

In another embodiment, the first magnetic coupling member has a similar number of first magnets as the second magnetic coupling member and the first magnetic coupling member has a similar number of second magnets as the second magnetic coupling member.

In another embodiment, each magnetic coupling member has at least two first magnets and at least two second magnets and the first and second magnets are positioned such that at least some of the first magnets are positioned between some of the second magnets.

In another embodiment, the first and second magnets are spaced apart in at least one line around the first face of each magnetic coupling member and positioned in each line such that outer poles of one polarity are positioned between outer poles of the reverse polarity.

In another embodiment, each of the magnetic coupling members is mounted on a common shaft and the first magnetic coupling member is mounted to the shaft to rotate with the shaft and the second magnetic coupling member is freely rotatably positioned on the shaft.

In another embodiment, the magnetic clutch is provided in an appliance having a moving member and a drive motor wherein the drive motor is drivingly connected via a linkage, which comprises the magnetic clutch.

In another embodiment, the magnetic clutch further comprises a brake manually engagable by a user for applying torque at least indirectly to at least one of the magnetic coupling members to cause the magnetic coupling members to move to a position in which the magnetic coupling members are not drivingly engaged to each other.

In another embodiment, the magnetic clutch further comprises a brake for applying torque at least indirectly to at least one of the magnetic coupling members to cause the magnetic coupling members to move to a position in which the magnetic coupling members are not drivingly engaged to each other, wherein the appliance is reconfigurable between first and second positions and the brake is automatically engaged when the appliance is reconfigured.

In another embodiment, the appliance is selected from the group consisting of a surface cleaning apparatus, a garden appliance and a power tool.

In accordance with another aspect of the instant invention, there is provided a magnetic clutch comprising (a) first and second magnetic means for releasably drivingly coupling the first magnetic coupling means to the second magnetic coupling means, (b) each of the first and second magnetic coupling means includes magnet means that, in a first orientation, magnetically couple the magnetic coupling means such that rotation of the first magnetic coupling means will cause rotation of the second magnetic coupling means and, in a second orientation, the first and second magnetic coupling means will magnetically repel each other; and, (c) at least one of the first and second magnetic coupling means is moveably mounted with respect to the other of the first and second magnetic means such that when the magnet means are in the second orientation, the magnetic coupling means will move apart.

In one embodiment, each of the magnetic coupling means is mounted on a common shaft and the first magnetic coupling means is mounted to the shaft to rotate with the shaft and the second magnetic coupling means is freely rotatably positioned on the shaft.

In another embodiment, the magnetic clutch further comprises brake means for applying torque to at least one of the magnetic coupling means to cause the magnet means to move to the second orientation.

In another embodiment, the magnetic clutch is provided in an appliance having a moving member and a drive means wherein the drive means is drivingly connected to the moving member by a motive force transmission means, which comprises the magnetic clutch.

In another embodiment, the magnetic clutch further comprises brake means manually engagable by a user for applying torque to at least one of the magnetic coupling means to cause the magnet means to move to the second orientation.

In another embodiment, the magnetic clutch further comprises brake means for applying torque to at least one of the magnetic coupling means to cause the magnet means to move to the second orientation, wherein the appliance is reconfigurable between first and second positions and the brake means is automatically engaged when the appliance is reconfigured.

In another embodiment, the appliance is selected from the group consisting of a surface cleaning apparatus, a garden appliance and a power tool.

In accordance with another aspect of the instant invention, there is provided an appliance comprising (a) a moving member;

(b) a drive motor; and, (c) a linkage drivingly connecting the drive motor to the moving member, the linkage including first and second magnetic coupling members.

In one embodiment, each magnetic coupling member has:

(a) a first surface which includes at least first and second magnets; and, (b) each of the first and second magnets have an outer pole and the outer poles of each of the first magnets and the outer poles of each of the second magnets are of reverse polarity, wherein at least one of the first and second magnetic coupling members is moveably mounted with respect to the other of the first and second magnetic coupling members in a direction perpendicular to the first faces.

In one embodiment, each magnetic coupling member is provided with a sufficient number of first and second magnets such that the first magnets of the first coupling member can align with the second magnets of the second coupling member and the second magnets of the first coupling member can align with the first magnets of the second coupling member.

In another embodiment, the first magnetic coupling member has a similar number of first magnets as the second magnetic coupling member and the first magnetic coupling member has a similar number of second magnets as the second magnetic coupling member.

In another embodiment, each magnetic coupling member has at least two first magnets and at least two second magnets and the first and second magnets are positioned such that at least some of the first magnets are positioned between some of the second magnets.

In another embodiment, the first and second magnets are spaced apart in at least one line around the first face of each magnetic coupling member and positioned in each line such that outer poles of one polarity are positioned between outer poles of the reverse polarity.

In another embodiment, each of the magnetic coupling members is mounted on a common shaft and the first magnetic coupling member is mounted to the shaft to rotate with the shaft and the second magnetic coupling member is freely rotatably positioned on the shaft.

In another embodiment, the appliance further comprises a brake member which is engagable to at least indirectly apply torque to the at least one of the magnetic coupling members. The brake member may be manually engagable by a user. Alternately, the appliance may be reconfigurable between at least two positions and the brake member is automatically engaged when the appliance is reconfigured.

In another embodiment, the appliance is selected from the group consisting of a surface cleaning apparatus, a garden appliance and a power tool.

In accordance with another aspect of the instant invention, there is provided an appliance comprising:
 (a) a moving member;
 (b) a drive means; and,
 (c) linkage means for drivingly connecting the drive means to the moving member, the linkage including first and second magnetic means for releasably drivingly coupling the first magnetic coupling means to the second magnetic coupling means.

In one embodiment, each of the first and second magnetic coupling means includes magnet means that, in a first orientation, magnetically couple the magnetic coupling means such that rotation of the first magnetic coupling means will cause rotation of the second magnetic coupling means and, in a second orientation, the first and second magnetic coupling means will magnetically repel each other.

In another embodiment, at least one of the first and second magnetic coupling means is moveably mounted with respect to the other of the first and second magnetic means such that when the magnet means are in the second orientation, the magnetic coupling means will move apart.

In another embodiment, each of the magnetic coupling means is mounted on a common shaft and the first magnetic coupling means is mounted to the shaft to rotate with the shaft and the second magnetic coupling means is freely rotatably positioned on the shaft.

In another embodiment, the appliance further comprises brake means for applying torque to at least one of the magnetic coupling means to cause the magnet means to move to the second orientation. The brake means may be manually engagable by a user.

In another embodiment, the appliance further comprises brake means for applying torque to at least one of the magnetic coupling means to cause the magnet means to move to the second orientation, wherein the appliance is reconfigurable between first and second positions and the brake means is automatically engaged when the appliance is reconfigured.

In another embodiment, the appliance is selected from the group consisting of a surface cleaning apparatus, a garden appliance and a power tool.

BRIEF DESCRIPTION OF THE DRAWINGS

These and other advantages of the instant invention will be more fully and completely understood in accordance with the following description of the preferred embodiments of the invention in which.

DETAILED DESCRIPTION OF THE INVENTION

According to a first aspect of this invention, a magnetic clutch is utilized in a surface cleaning apparatus, such as a sweeper, a vacuum cleaner or a carpet cleaner to drivingly connect a brush motor with a rotating or oscillating brush. According to this aspect of the invention, a motive force transmission means is used to drivingly connect the brush motor to the brush. The motive force transmission means may include or consist of a magnetic clutch. The magnetic clutch may be of any particular design that uses the attractive forces between oppositely positioned magnets to transmit the motive force from a brush motor to the brush.

In accordance with a second aspect of the instant invention, a magnetic clutch is utilized in an appliance and, preferably, an appliance for use in a domestic environment, to connect a drive motor with a moving member. The appliance may be a power tool, such as a power drill, jig saw, a circular saw, a sander, or any other power tool wherein the power tool has a moving member which is driven by a motor and wherein an external force may be applied to the moving member if the moving member is not disengaged in the drive motor.

The appliance could also be a garage door opener or a garden tool, such as a lawn mower, edge trimmer, hedge trimmer or any other tool wherein the tool has a moving member (e.g. the blade of a lawn mower, the reciprocating blade of a hedge trimmer, the rotating action of a cutting wire in an edge trimmer) which is driven by a drive motor.

In accordance with a further aspect of the instant invention, an improved magnetic clutch is provided. Preferably, the improved magnetic clutch is used in an appliance and, in particular, a surface cleaning apparatus.

Figure 1:
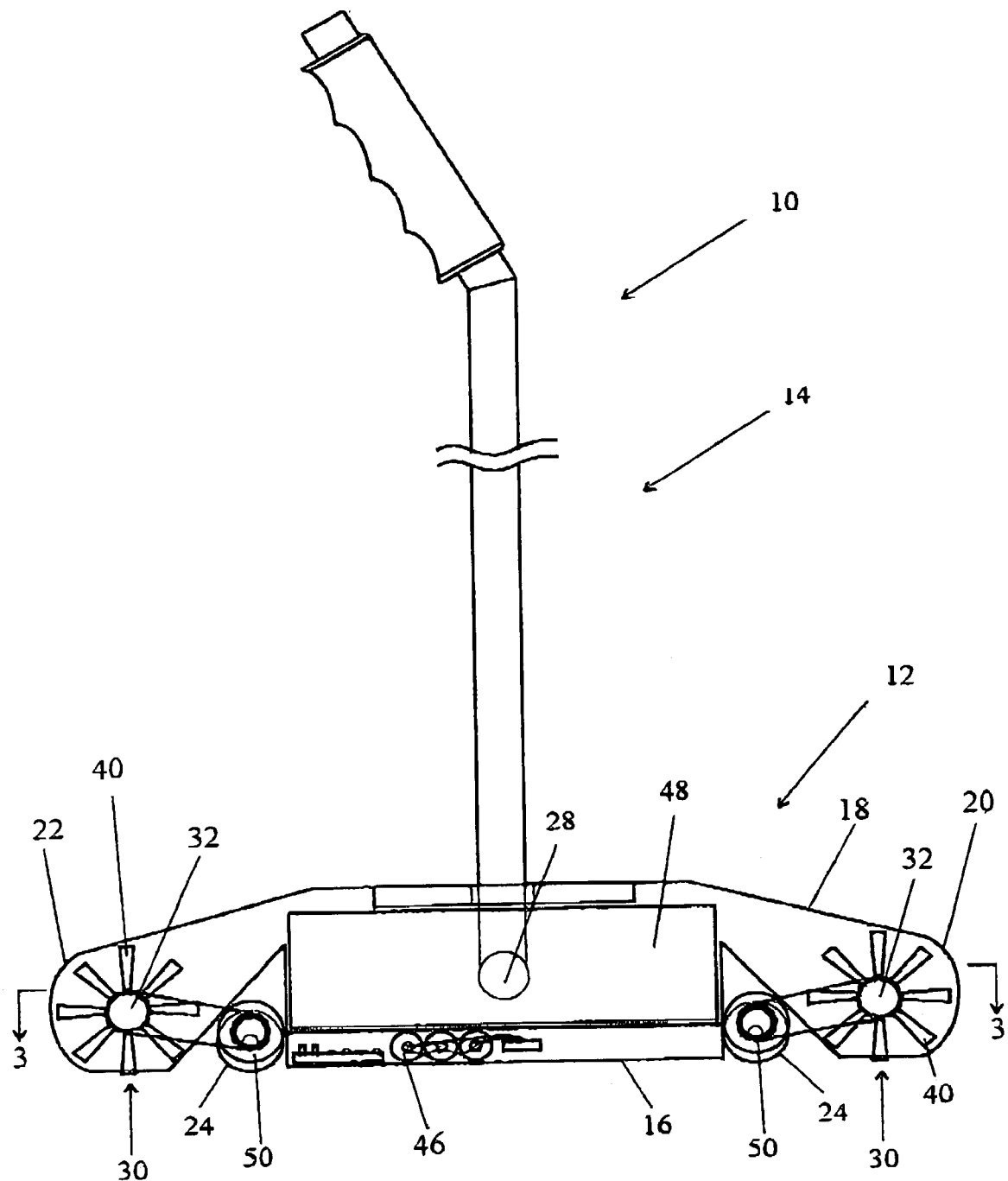
FIG. 1 is a vertical section through a vacuum cleaner along the line 1—1 which is shown in FIG. 2.
Figure 2:
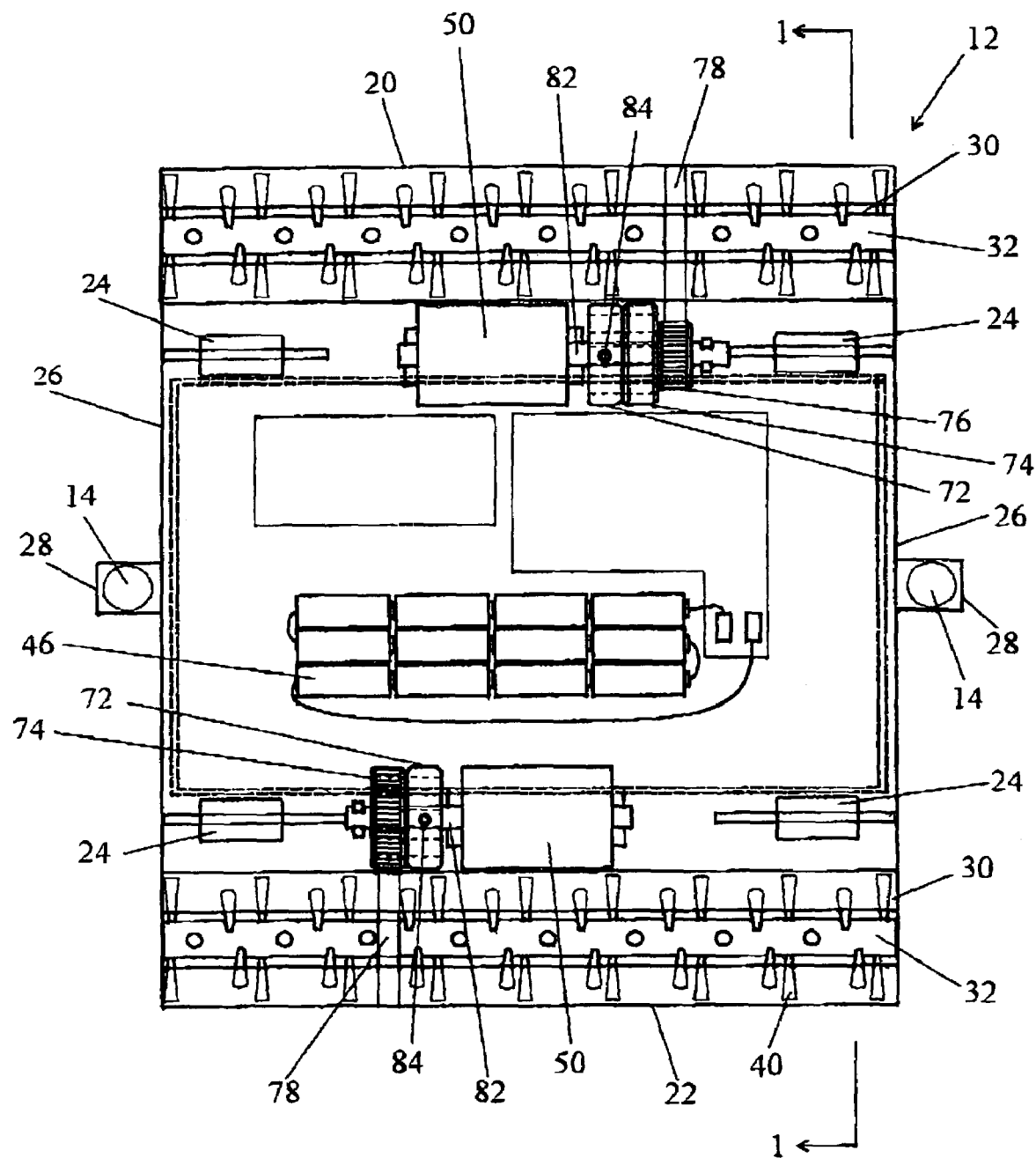
FIG. 2 is a bottom plan view of the vacuum cleaner of FIG. 1 wherein the bottom plate is shown as transparent so that the interior components are visible.

Referring to FIGS. 1 and 2, a dual brush surface cleaning apparatus 10 utilizing a magnetic clutch is shown. Surface cleaning apparatus 10 may be a sweeper or a vacuum cleaner, depending upon whether a suction fan is provided. It will be appreciated that the magnetic clutch may be utilized in any other surface cleaning apparatus such as a carpet cleaner, a stick vacuum cleaner, a canister vacuum cleaner, a central vacuum system or any other configuration of vacuum cleaner or sweeper in which a rotating or oscillating brush is provided. Further, the configuration of the surface cleaning apparatus may be of any particular design.

As shown in FIGS. 1 and 2, surface cleaning apparatus 10 has a surface cleaning head 12 and a handle 14, which is pivotably mounted to sides 26 of surface cleaning head 12 by means of pivots 28 Surface cleaning head 12 has a bottom 16, a top 18, a front 20 and a rear 22.

Figure 3:
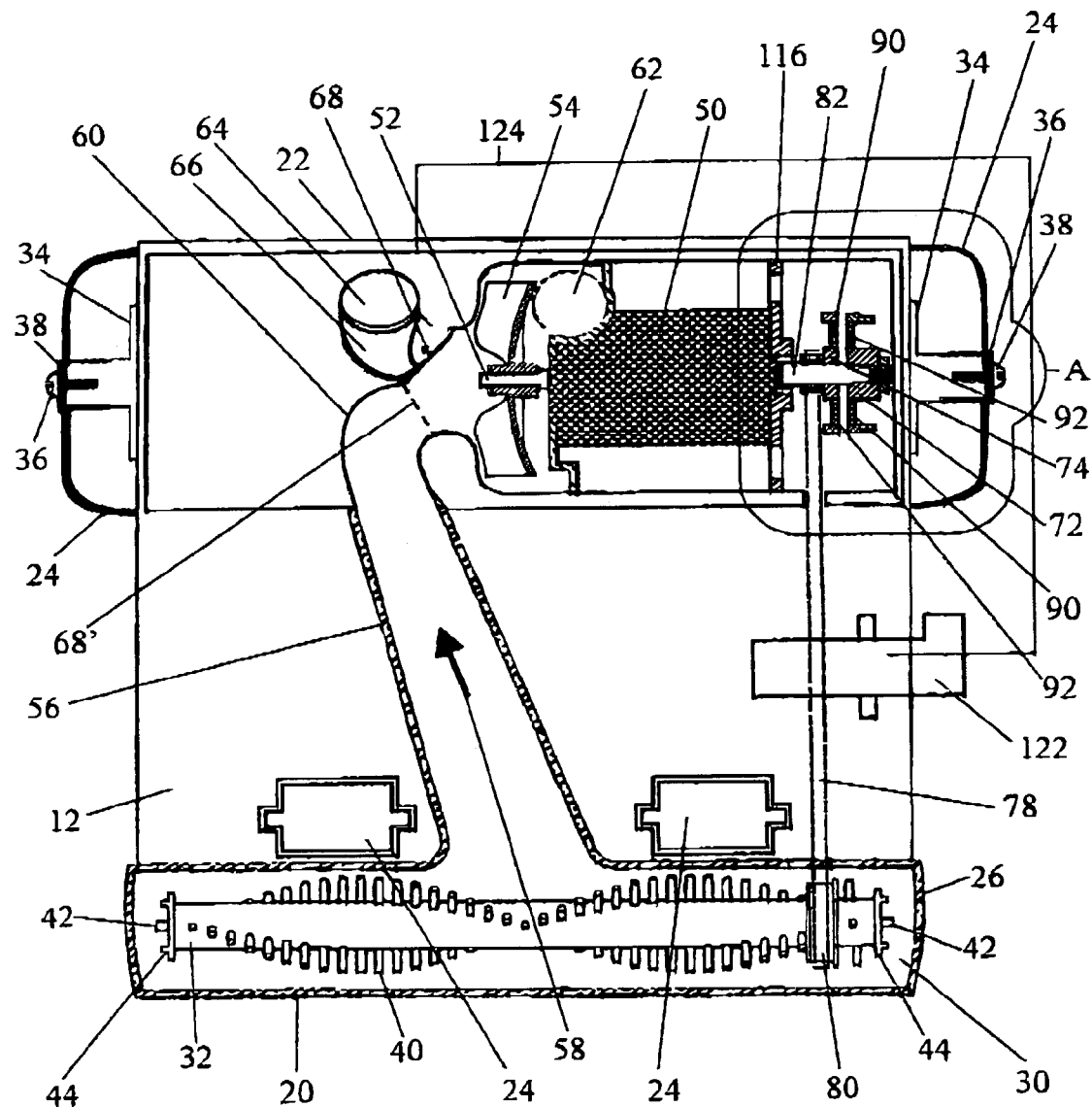
FIG. 3 is a cross section along line 3—3 which is shown in FIG. 1 of an alternate surface cleaning head in accordance with an alternate embodiment of the instant invention.
Figure 4:
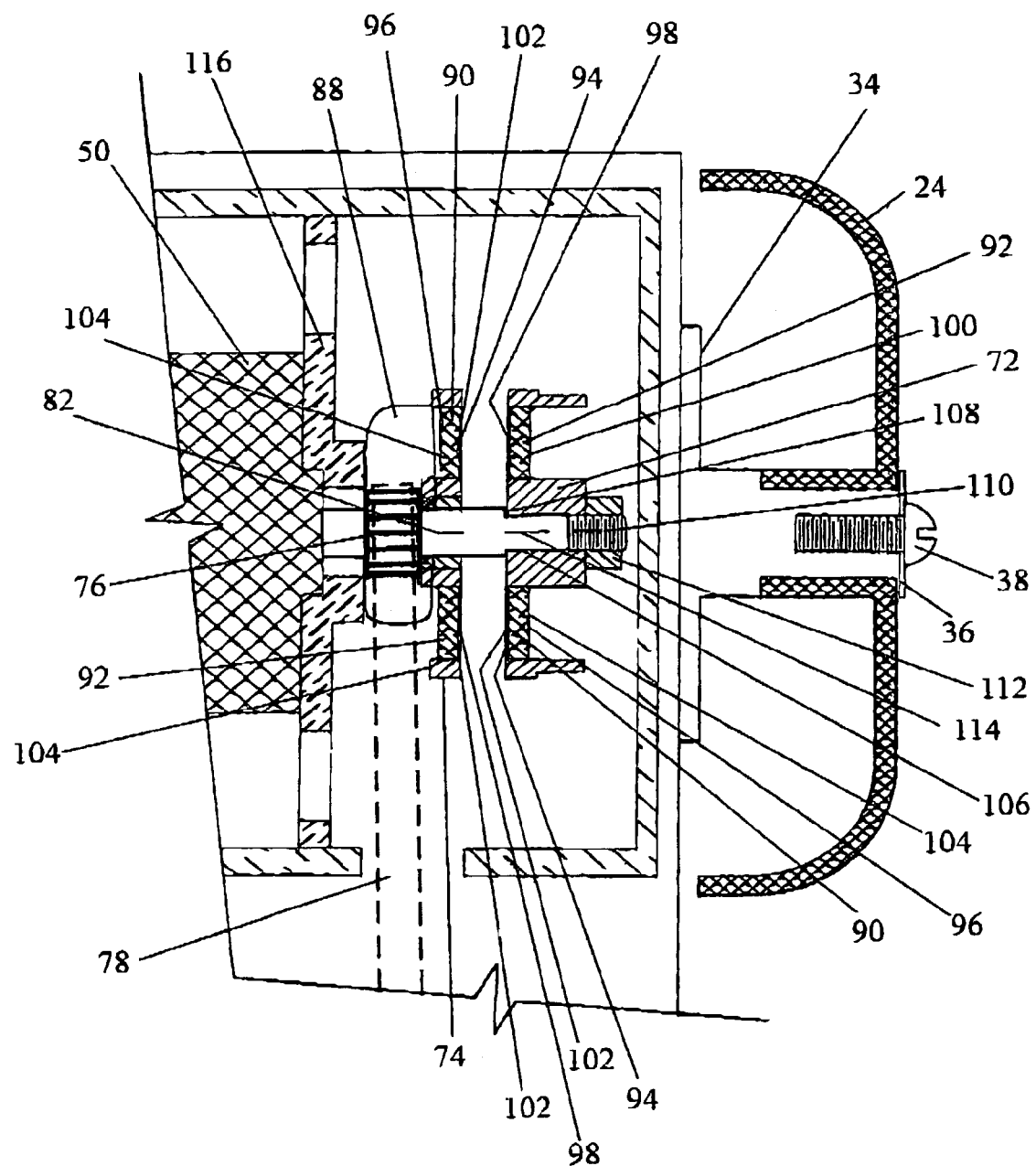
FIG. 4 is an enlargement of area A shown in FIG. 3.
Figure 5:
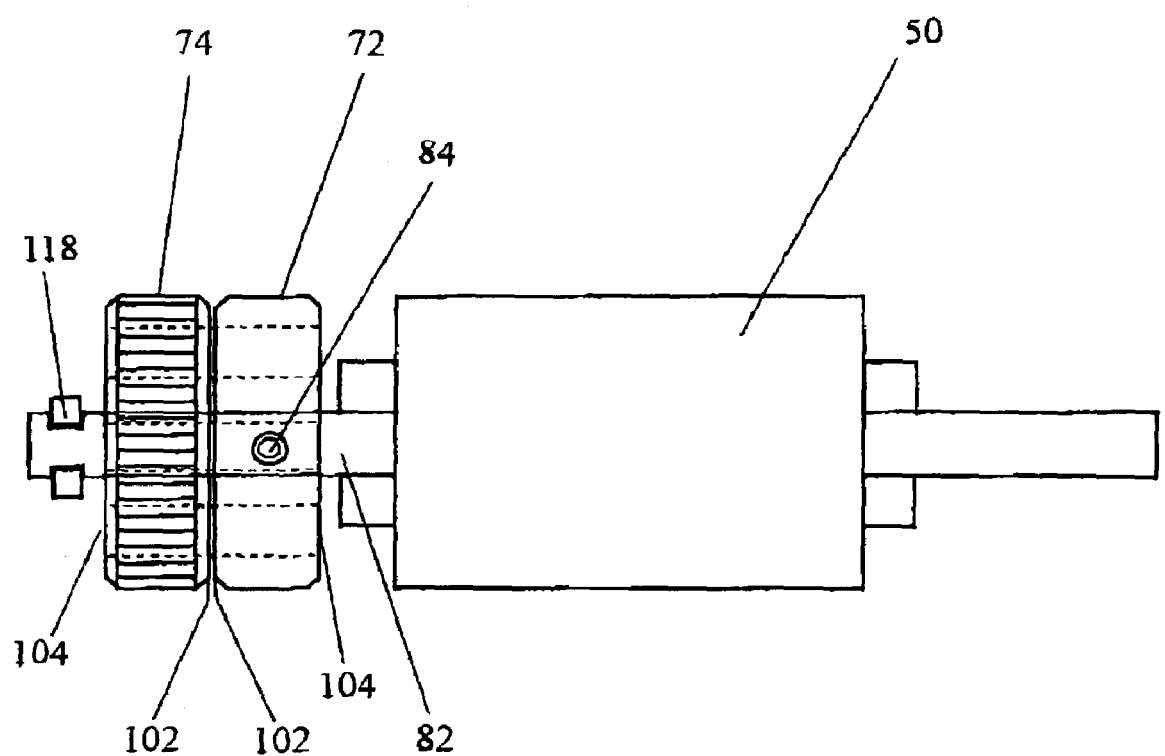
FIG. 5 is a side view of a magnetic clutch according to one embodiment of the instant invention in a first orientation, namely when the plates of the magnetic clutch are magnetically coupled.
Figure 6:
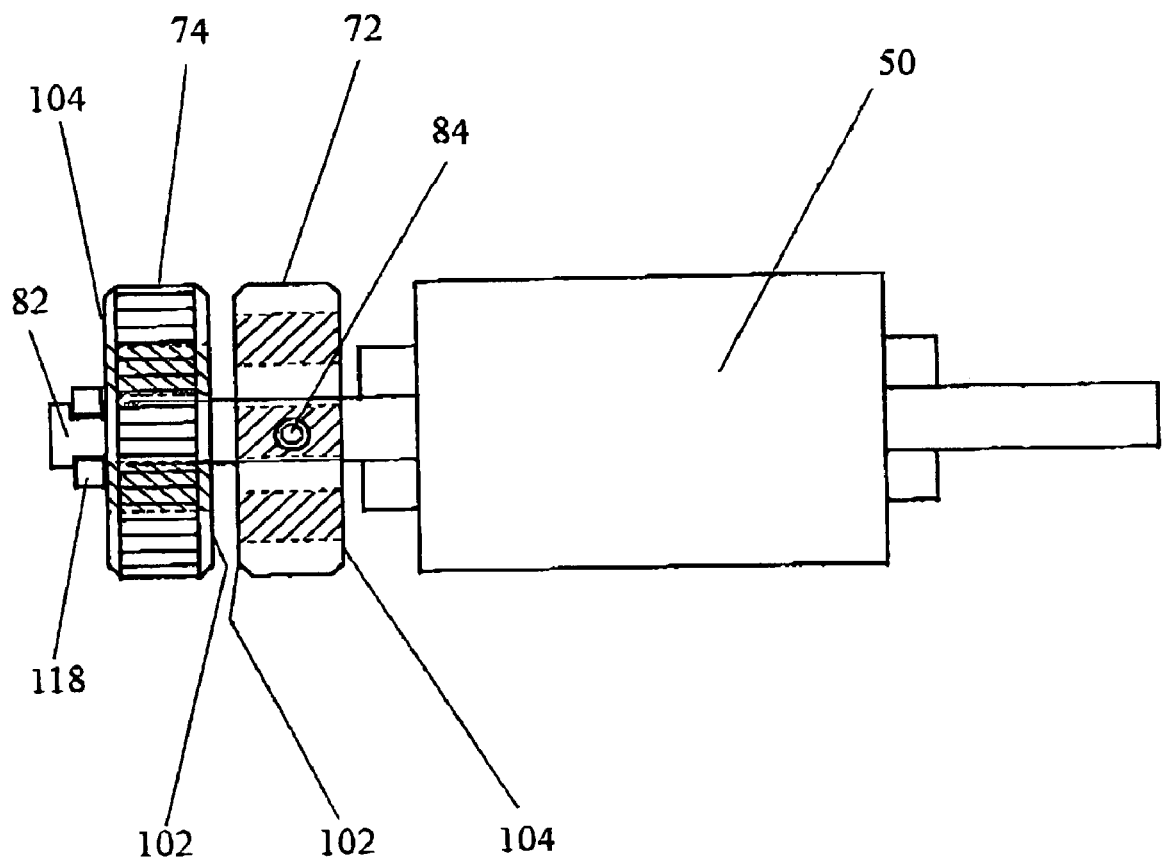
FIG. 6 is a side view of the magnetic clutch of FIG. 5 in a second orientation, namely when the plates of the magnetic clutch are magnetically decoupled.

A plurality of wheels 24 are preferably provided in surface cleaning head 12 to permit surface cleaning head 12 to be moved over a surface to be cleaned. It will be appreciated by those skilled in the art that the wheels may be mounted by any means to floor cleaning head 12 and may be provided at any desired location on cleaning head 12. The wheels, or other means known in the art, are typically designed to maintain a minimum space in between the floor or carpet being cleaned and bottom 16 of surface cleaning head 12. For example, as shown in FIG. 2, wheels 24 are mounted on bottom 16. Alternately, as shown in FIGS. 3 and 4, two wheels 24 are mounted on bottom 16 and two wheels 24 are mounted adjacent rear 22 by means of wheel mounts 34 which are provided on side 26 of surface cleaning head 12. Wheels 24 are mounted to wheel mounts 34 by means of support washers 36 and screws 38. However, any mounting means known in the art may be utilized.

Rotary brush 32 is typically provided with a plurality of bristles 40. Brush 32 may be movably mounted in surface cleaning head 12 by any means known in the art. Brush 32 is preferably rotatably mounted but may also oscillate or use any other cleaning motion known in the surface cleaning art. An example of a rotatable mount for a brush 32 is shown in FIG. 3. As shown therein, brush 32 has a central shaft 42 that is received in roller bearings or bushings 44. Bushings 44 are mounted to surface cleaning head 12 by any means known in the art so that brush 32 is associated with dirt inlet 30 so as to assist in cleaning a surface and, preferably, is mounted generally above dirt inlet 30 such that a portion of bristles 40 extend downwardly through dirt inlet 30. Typically, brush 32 is mounted such that a portion of bristles 40 extend below inlet 30 so as to contact the surface being cleaned.

Surface cleaning apparatus 10 may be powered by any means known in the art. For example, as shown in FIGS. 1 and 2, surface cleaning apparatus 10 is powered by a plurality of batteries 46. However, surface cleaning apparatus 10 may also be powered by AC current which is obtained by connecting surface cleaning apparatus 10 to a household electrical outlet by means of an electric cord (not shown) as is known in the art.

As shown in FIGS. 1 and 2, surface cleaning apparatus 10 comprises a sweeper, which uses the mechanical action of brushes 32 to transport dirt from a surface being cleaned into dirt bin 48. As shown in FIGS. 3 and 4, surface cleaning apparatus 10 comprises a vacuum cleaner, which includes an electric motor 50 having a shaft 52 to which fan blade 54 is attached. When motor 50 is energized, fan blade 54 rotates producing a suction that draws air through dirt inlet 30, through duct 56 in the direction of arrow 58, through passage 60, past fan blade 54 to up duct 62 which is in fluid flow communication with a filter means surface cleaning apparatus 10 which may utilize any filter means known in the art. If surface cleaning apparatus 10 is a vacuum cleaner, then it may use two motors, a brush motor and a separate suction motor as is known in the art. Alternately, as shown in FIGS. 3 and 4, a single motor may be used to drive both the brush and produce suction.

Optionally, as is known in the art, surface cleaning apparatus 10 may have an extension hose (not shown) for above floor cleaning. In such a case, surface cleaning head 12 may be provided with a socket 64 which may be connected to an above floor cleaning hose. Socket 64 is provided on passage 66 that connects socket 64 with passage 60 so that socket 64 is in air flow communication with fan blade 54. An air control flow valve 68 is provided in passage 60 and is movable between first position (which is shown in solid line in FIG. 3) in which valve 68 isolates passage 60 from fan 54 and a second position (shown by dashed line 68' shown in FIG. 3) in which the valve isolates dirt inlet 30 from fan blade 54. In this way, either an extension wand for above floor cleaning or dirt inlet 30 may be selectively connected in airflow communication with a source of suction (motor 50 and fan blade 54). Valve 68 may be of any particular construction known in the art and the extension hose may be connected to socket 64 by any means known in the art. Preferably, valve 68 is constructed such that when the above floor cleaning hose is in air flow communication with socket 64, valve 68 is automatically positioned such that passage 66 is in air flow communication with the suction source and dirt inlet 30 is isolated from the suction source.

One advantage to the use of a magnetic clutch in a vacuum cleaner having an above floor cleaning feature and a single motor to drive a brush and produce suction is that the brush may be stopped from rotating by applying a force to magnetically decouple the magnetic clutch. Thus the suction motor may be used in the above floor cleaning mode without the brush rotating.

In application in a surface cleaning head, brush drive motor 50 is drivingly connected to rotary brush 32 by means of the linkage. As shown in FIG. 2, two different configurations for a linkage for use in a surface cleaning head are provided. The linkage at front end 20 of surface cleaning head 12 comprises first magnetic coupling member 72, second magnetic coupling member 74, drive pulley 76 and fan belt 78 which is drivingly connected to brush 32 by means of a pulley 80 (see FIGS. 3 and 4). Alternately, as shown at rear end 22 of surface cleaning head 12 in FIG. 2, a drive pulley may be formed as the outer surface of second magnetic coupling member 74 such that the linkage comprises first magnetic coupling member 72, second magnetic coupling member 74, fan belt 78 and pulley 80, which is mounted on brush 32.

Figure 7:
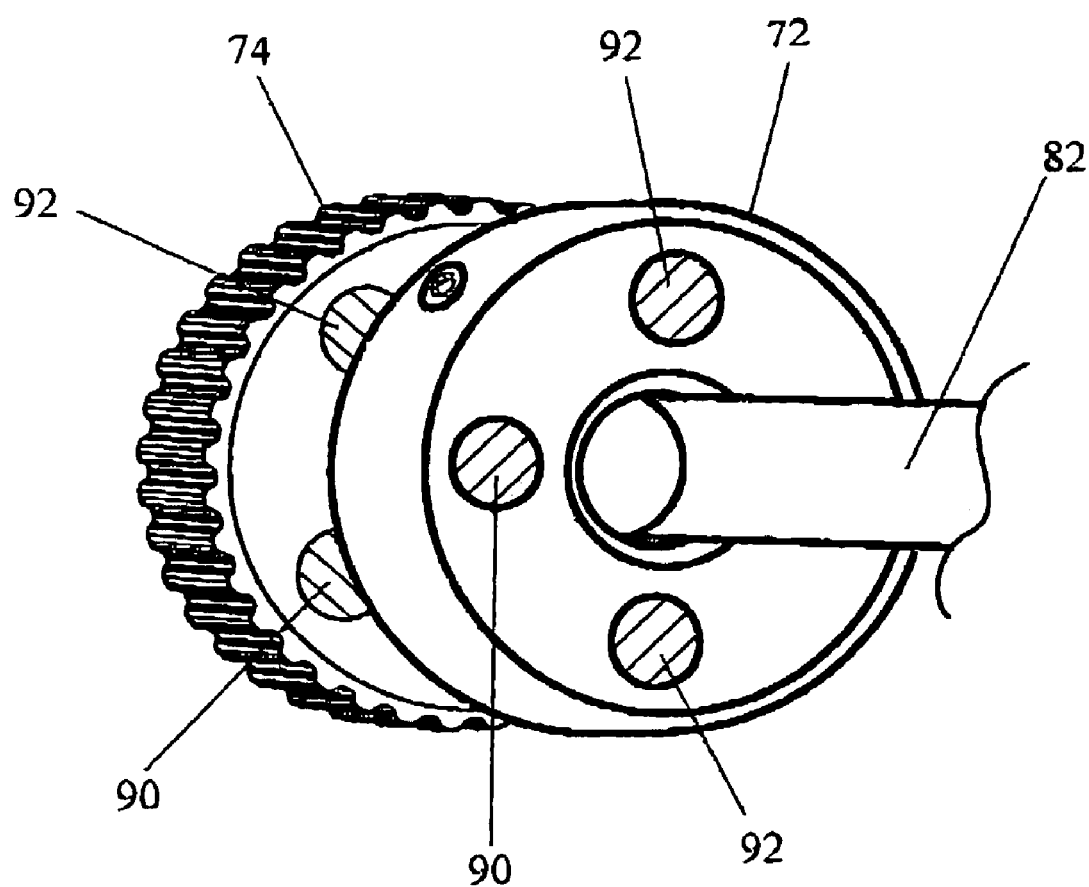
FIG. 7 is a perspective view of the plates of FIG. 6.

The fan belt and pulleys may be of any design known in the art. As shown in FIG. 7, the drive pulley (the outer surface of second magnetic coupling member 74) may have a toothed surface and fan belt 78 may also be toothed. Similarly, pulley 80 may have a toothed surface or may have a flat surface and tension in the belt maintains fan belt 78 in driving engagement with pulley 80.

According to this first aspect of the invention, first magnetic coupling member 72 comprises at least one magnet and second magnetic coupling member 74 comprises at least one magnet whose poles are oriented so as to attract the magnet of first magnetic coupling member 72. First magnetic coupling member 72 is non rotatably mounted to shaft 82 of motor 50 by any means known in the art, such as by means of a set screw 84. Second magnetic coupling member 74 is freely rotatably positioned on shaft 82 (i.e. is will not rotate if shaft 82 rotates). When motor 50 is energized, shaft 82 will rotate causing first magnetic coupling member 72 to rotate. Due to the attractive forces between the magnets on first and second coupling member 72 and 74, second magnetic coupling member 74 will rotate driving fan belt 78 which causes brush 32 to rotate. Any torque (i.e. anti rotational force) applied to brush 32 will be indirectly applied to second magnetic coupling member 74 by its transmission via fan belt 78 to second magnetic coupling member 74. If the torque exceeds the attractive force between the magnets on first and second magnetic coupling members 72 and 74, then first magnetic coupling member 72 will no longer be able to cause second magnetic coupling member 74 to rotate thereby disengaging fan belt 78 from motor 50 and causing brush 32 to cease rotating. When the torque applied to rotatable brush 32 is removed, then the attractive forces between the magnets of first and second magnetic coupling member 72 and 74 will again cause second magnetic coupling member 74 to rotate thereby causing brush 32 to rotate.

It will be appreciated by those skilled in the art that first magnetic coupling member 72 may be non rotatably mounted to shaft 82 by various connecting means such as by means of a splined shaft, a interference fit between the opening in first magnetic coupling member 72 and the outer surface of shaft 82, an adhesive between the opening in first magnetic coupling member 72 and the outer surface of shaft 82, by welding first magnetic coupling member 72 to shaft 82 or by any other means known in the art. It will also be appreciated by those skilled in the art that first magnetic coupling member 72 may be slidably mounted on shaft 82 (i.e. towards or away from motor 50 while being non rotatably mounted to shaft 82). Alternately, first magnetic coupling member 72 may be fixedly mounted to shaft 82 (such as by a set screw 84) so that first magnetic coupling member 72 is non rotatably mounted to shaft 82 and, in addition, is non-slidably mounted to shaft 82 (i.e. it is mounted at a fixed position on shaft 82).

Figure 8:
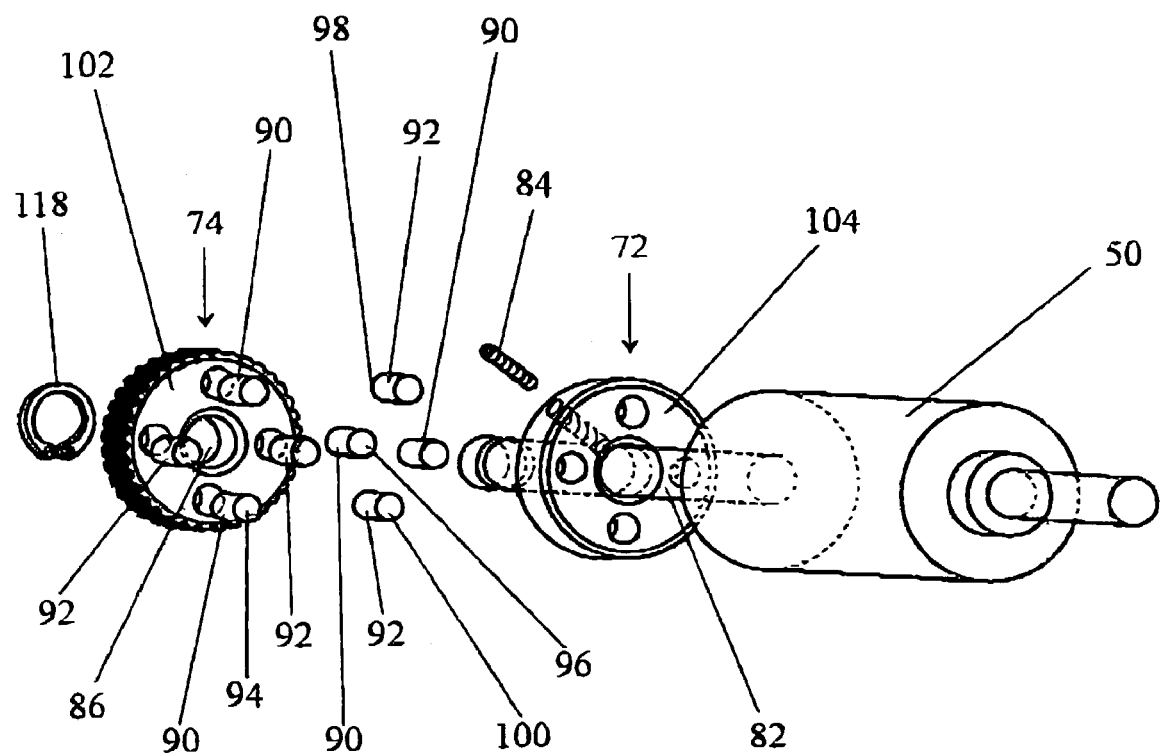
FIG. 8 is an exploded view of the magnetic clutch of FIG. 5.
Figure 9:
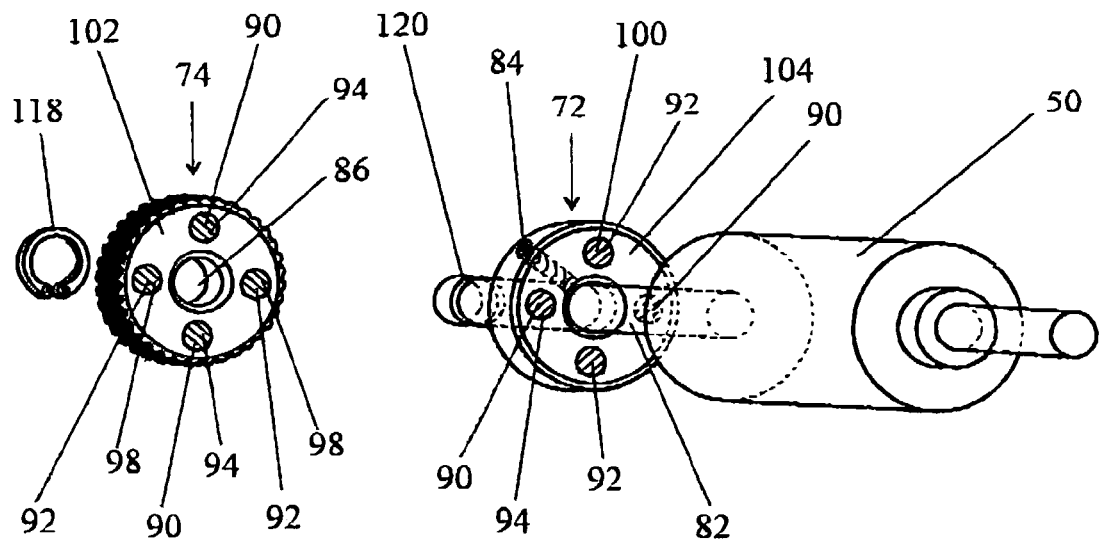
FIG. 9 is a partially exploded view of the magnetic clutch of FIG. 5 in the first orientation shown in FIG. 5.
Figure 10:
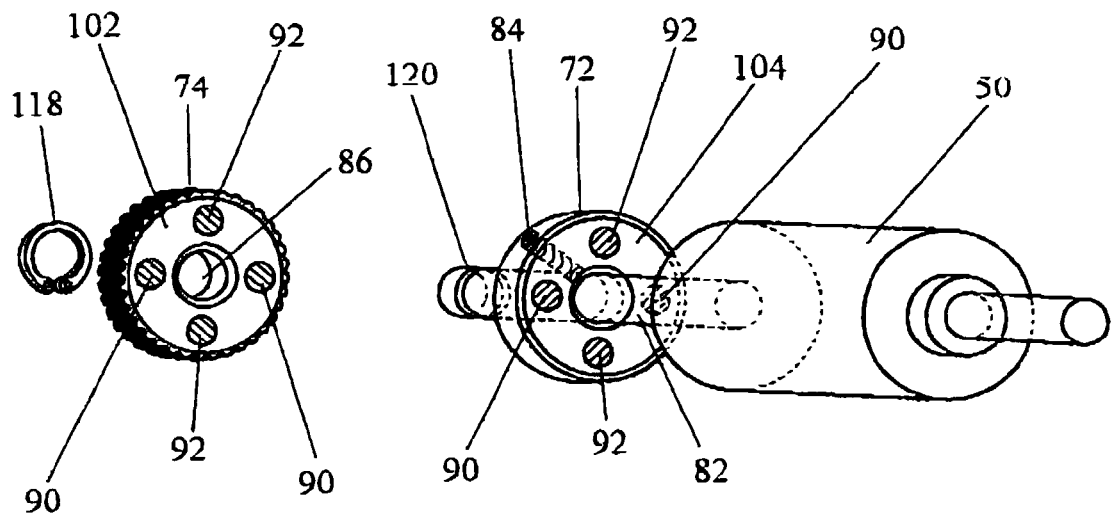
FIG. 10 is a partially exploded view of the magnetic clutch of FIG. 5 in the second orientation shown in FIG. 6.

Second magnetic coupling member 74 may be freely rotatably mounted on shaft 82 by any means known in the art. For example, as shown in FIG. 8, second magnetic coupling member 74 may have a central opening 86, which has a larger diameter than the diameter of shaft 82. Alternately, second magnetic coupling member 74 may be mounted on a bearing which, in turn, is mounted on shaft 82. Any other means known in the art may also be used.

It will be appreciated that in some configurations, the drive linkage between the moving member and motor 50 may be a direct drive system. For example, first magnetic coupling member 72 may be non rotatably mounted to shaft 82 of motor 50 and second magnetic coupling member 74 may be non rotatably mounted to a second shaft that is drivingly connected to the moving member. For example, in the case of a suction cleaner, motor 50 could be positioned in line with brush shaft 42 such that, when assembled, brush shaft 42 is positioned adjacent motor shaft 82 and second magnetic coupling member 74 is non rotatably mounted on brush shaft 42. Accordingly, no fan belt is required in the linkage.

Figure 13:
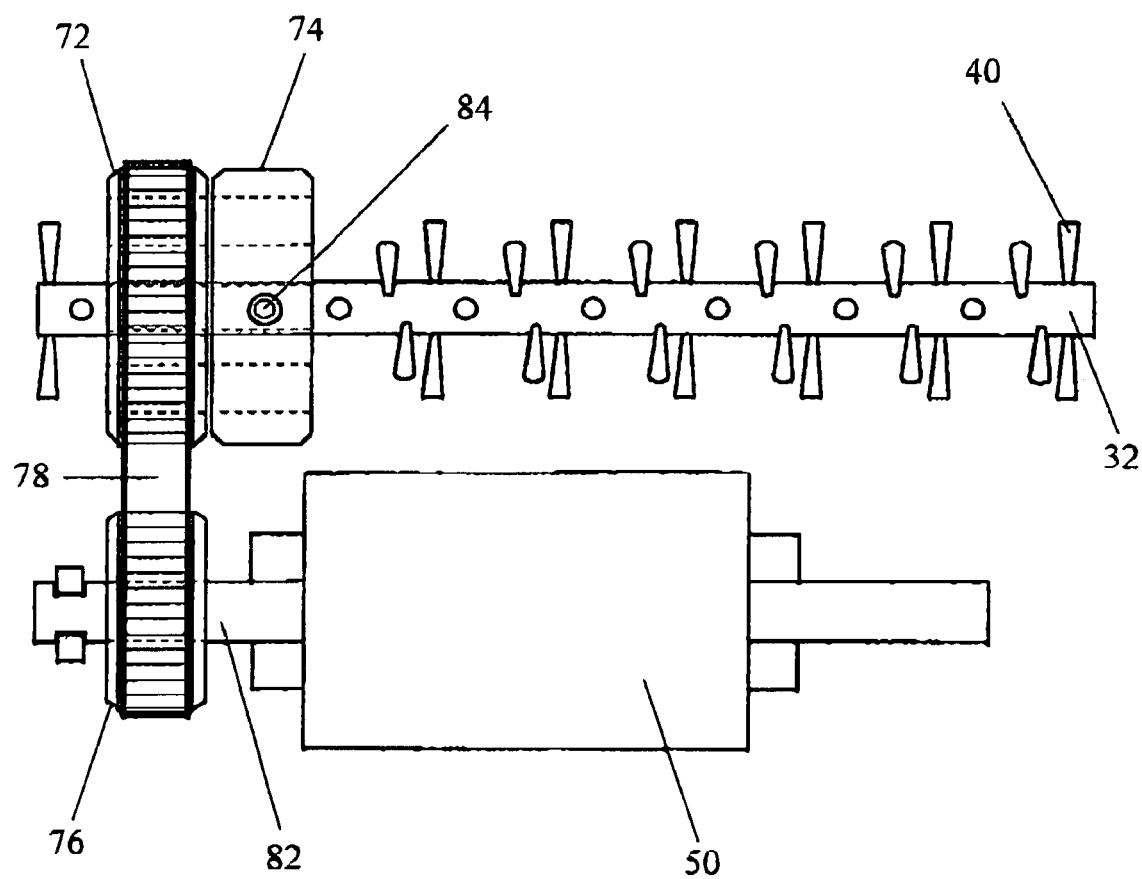
FIG. 13 is a further alternate embodiment of a magnetic clutch according to the instant invention wherein the magnetic clutch is connected to a rotary brush of a surface cleaner head.
Figure 14:
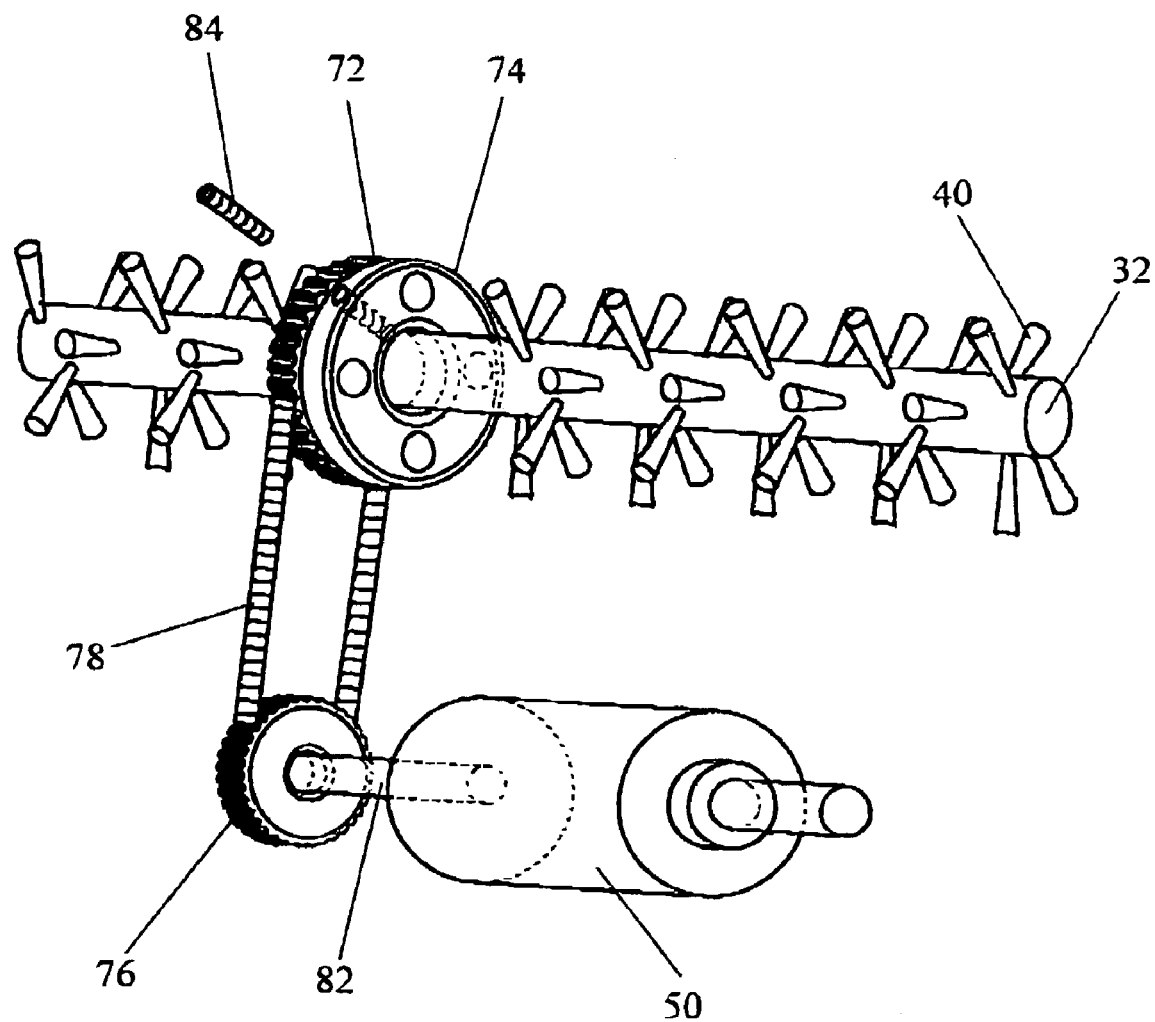
FIG. 14 is a partially exploded, perspective view of the magnetic clutch of FIG. 13

In the alternate embodiment of FIGS. 13 and 14, both of first and second magnetic coupling members 72, 74 are positioned on brush 32. As shown in this embodiment, drive pulley 76 is non rotatably mounted to shaft 82 of motor 50. First magnetic coupling member 72 has an outer surface, which is adapted to be driven by fan belt 78. First magnetic coupling member 72 is freely rotatably mounted on brush 32. Second magnetic coupling member 74 is non rotatably mounted to brush 32 by means, for example, of set screw 84 According to this embodiment, when motor 50 is energized, shaft 82 drives drive pulley 76 thereby causing fist magnetic coupling member 72 to rotate due to the rotation of fan belt 78. The attractive force between the magnets of first and second magnetic coupling members 72, 74 causes second magnetic coupling member 74 to rotate. The rotation of second magnetic coupling member 74 causes brush 32 to rotate. If brush 32 becomes jammed, then a torque or non rotational force is to second magnetic coupling member 74 thereby disengaging the magnetic coupling between member 72, 74 thereby terminating the rotation brush 32. It will be appreciated that various other possible configurations for the linkage may be used.

Surface cleaning apparatus 10 may be provided with a signaling member to advise a user if there is a brush jam. For example, top 18 of surface cleaning head 12 may be provided with a window so that a user may view the rotation of a member of the linkage and, preferably, fan belt 78. Preferably, fan belt 78 has a pattern applied to its outer surface so as to assist a user to detect whether fan belt 78 is moving. When a user detects that fan belt 78 has ceased movement, the user may turn appliance 10 off and clear the brush jam. The attractive forces between first and second magnetic coupling members 72, 74 will then cause the members to become magnetically coupled thereby again drivingly connecting motor 50 to fan belt 78.

FIG. 4 exemplifies a preferred embodiment for a magnetic clutch that may be used in an appliance. As shown in FIG. 4, the magnetic clutch comprises first and second magnetic coupling member 72, 74, each of which has a first surface 102 and a second surface 104. First and second magnetic coupling member 72, 74 are positioned such that first surfaces 102 face each other. Each magnetic coupling member 72, 74 has one first magnet 90, having an outer pole 94 and an inner pole 96, and one second magnet 92 having an inner pole 96 and an outer pole 98 and an inner pole 100. The polarity of outer pole 94 of first magnet 90 is the opposite or reverse to the polarity of outer pole 98 of second magnet 92. For example, the polarity of outer pole 94 of first magnet 90 may be north. In such a case, the polarity of outer pole 98 of second magnet 92 is south. Accordingly, outer poles 94 and 98 will attract each other. In the configuration of FIG. 4, first magnet 90 of second magnetic coupling member 74 is positioned opposite second magnet 92 of first magnetic coupling member 72. Similarly, second magnet 92 of second magnetic coupling member 74 is aligned with first magnet 90 of first magnetic coupling member 72. As the first magnets are attracted to the second magnets, first magnetic coupling member 72 is oriented to magnetically couple with second magnetic coupling member 74 so that rotation of second magnetic coupling member 74 is driven by the rotation of first magnetic coupling member 72.

It will be appreciated that if second magnetic coupling member 74 were rotated 180° around shaft 82, that the first magnets would be positioned opposite each other and the second magnets would also be positioned opposite each other. In this position, like poles would be facing each other resulting in first magnets 90 repelling each other and second magnets 92 repelling each other. In this orientation, first and second magnetic coupling members 72, 74 are magnetically decoupled and rotation of first magnetic coupling member 72 will not induce a rotation in second magnetic coupling member 74.

In accordance with another aspect of the instant invention, an improved magnetic clutch is provided. Preferably, at least one of first and second magnetic coupling members 72, 74 is moveable towards and away from the other. For example, one or both of first and second magnetic coupling members 72, 74 may be slideably mounted on shaft 82. An advantage of this aspect of the invention is that if the magnetic coupling members 72, 74 become decoupled, they will move apart. Once they have moved apart, continued rotation of the one of the magnetic coupling members with respect to the other will not induce eddy currents, or will induce a reduced amount of eddy currents, so as to protect the magnets from overheating until motor 50 is de-energized.

Such an embodiment is exemplified in FIG. 4. According to this embodiment, only second magnetic coupling member is slidably mounted on shaft 82. First magnetic coupling member 72 is fixedly mounted (i.e. non rotationally and non slidably) mounted to shaft 82. Shaft 82 has a narrow portion 106 so as to define an abutment wall 108. A screw thread 110 is provided at the end of shaft 82 so that first magnetic coupling member 72 may be secured thereon by means of a nut 112. First magnetic coupling member has a central opening therethrough, which has a diameter smaller than the diameter of shaft 82 so that a portion of first surface 102 abuts against abutment wall 108. When nut 112 is tightened, first magnetic coupling member 72 is fixedly mounted to narrow portion 106 of shaft 82. However, central opening 86 of second magnetic coupling member 74 is larger than the diameter of shaft 82 so that second magnetic coupling member may travel in the direction of longitudinal axis 114 of shaft 82 towards or away from first surface 102 of first magnetic coupling member 72. In particular, second magnetic coupling member 74 may travel along axis 114 (in a direction perpendicular to first surface 102) between first surface 102 of first magnetic coupling member 72 and motor mount 116.

Accordingly, when the magnets of first and second magnetic coupling members 72, 74 are oriented as shown in FIG. 4, first magnets 90 attract second magnets 92 causing second magnetic coupling member 74 to move laterally so as to abut or contact first magnetic coupling member 72. Once the magnetic coupling members are in intimate contact, the rotation of first magnetic coupling member 72 will cause a matching rotation in second magnetic coupling member 74 because of the attractive magnetic forces coupling them together. If a foreign object causes the rotation of brush 32 to drastically slow or stall, the resulting torque will cause pulley 80 to deliver a force through belt 78 to second magnetic coupling member 74 which will in turn cause first and second magnets 90, 92 in second magnetic coupling member 74 to lose their radial alignment with first and second magnets 90, 92 of first magnetic coupling member 72 thereby causing first magnets 90 to face each other and second magnets 92 to face each other. The resultant magnetic repulsion will cause second magnetic coupling member 74 to move away from first magnetic coupling member 72 thereby breaking the magnetic coupling between magnetic coupling members 72, 74. Thus, power is no longer delivered to brush 32.

Due to the repelling influence caused by like magnets having like poles aligned with each other, the magnetic coupling of member 72, 74 will not be restored until motor 50 is de-energized and the rotation of shaft 82 is substantially slowed or terminated. Depending upon the actual configuration, only once the speed of shaft 82 becomes relatively low (e.g. 2 to 3 rpm), will the first magnets be able to re-align with the second magnets thereby restoring the magnetic coupling between first and second magnetic coupling member 72, 74. Accordingly, motor 50 and belt 78 and pulley 80 are all protected from high torque conditions which may damage them.

Once motor 50 is de-energized, the magnetic repulsion between first magnets 90 and the magnetic repulsion between second magnets 92, combined with the magnetic attraction between first and second magnets 90 and 92 will cause second magnetic coupling member 74 to rotate to move into a first orientation in which a first magnet 90 is positioned in radial alignment with a second magnet 92 thereby permitting first and second magnetic coupling members 70, 72 to come into intimate contact with each other thereby creating a magnetic coupling between first and second magnetic coupling members 72, 74.

It will be appreciated that one or both of the magnetic coupling members 72, 74 may be moveably mounted with respect to the other by any means known in the art. For example, in the embodiment of FIGS. 5–10, second magnetic coupling member 74 is retained on shaft 82 by means of clamp 118, which is received in grove 120. Accordingly, second magnetic coupling member 74 is movable laterally along shaft 82 between clamp 118 and first magnetic coupling member 72.

Preferably, as shown in the alternate embodiment of FIGS. 5–10, each magnetic coupling member 72, 74 has two first magnets 90 and two second magnets 92. Preferably, the first and second magnets 90, 92 are positioned on each magnetic coupling member 72, 74 such that some of the first magnets are positioned between some of the second magnets. More preferably, a similar number of first and second magnets are provided in each magnetic coupling member 72, 74 such that each first magnet 90 is positioned between a second magnet 92 and, similarly, a second magnet 92 is positioned between two first magnets 90. In a particularly preferred embodiment, the magnets are evenly spaced and oriented in a line on first surface 102. As exemplified in FIG. 8, magnetic coupling members 72, 74 are disc shaped and the magnets 90, 92 are positioned inwardly the same distance from the perimeter of magnetic coupling members 72, 74 and equidistantly spaced apart so that they are set out in a single line. In an alternate embodiment, it will be appreciated that a plurality of lines of magnets may be provided (e.g. a first row may be spaced a first distance from the perimeter and a second row may be spaced a second distance from the perimeter). If will also be appreciated that other configurations may be used provided that the magnetic coupling members 72, 74 are moveable between a first orientation in which magnetic coupling members 72, 74 attract each other (e.g., see FIG. 9) and a second orientation in which magnetic coupling members 72, 74 repel each other (e.g., see FIG. 10)

In general, the number of magnets provided on a magnetic coupling member and the configuration of the magnets and the orientation of the poles of the magnets is sufficient such that the first magnets of the first coupling member can align with the second magnets of the second coupling member and, in addition, the second magnets of the first coupling member can align with the first magnets of the second coupling member so that the members 72, 74 are magnetically coupled.

Figure 11:
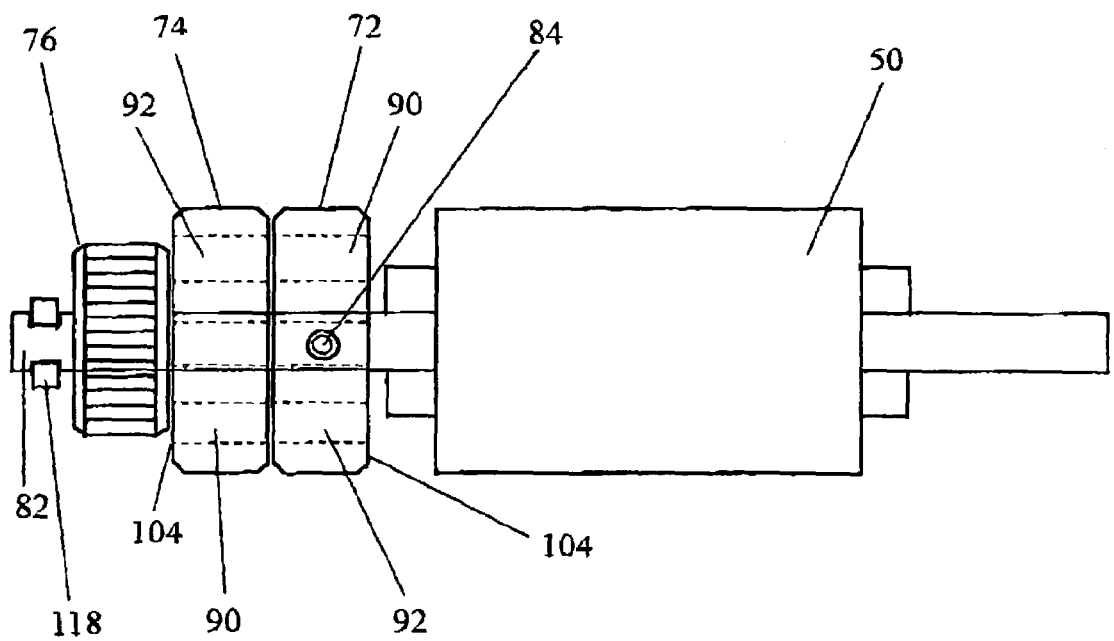
FIG. 11 is a side view of a magnetic clutch according to an alternate embodiment of the instant invention.
Figure 12:
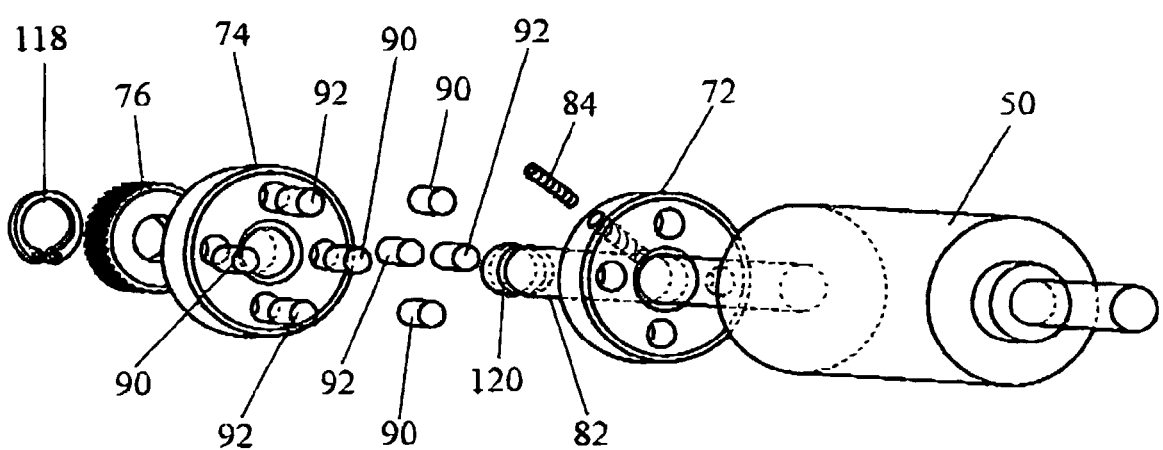
FIG. 12 is an exploded view of the magnetic clutch of FIG. 11.

FIGS. 11 and 12 show a further alternate embodiment. In this alternate embodiment, the track for fan belt 78 is not provided on the outer surface of second magnetic coupling member 74. Instead, a drive pulley 76 is non-rotatably mounted to second magnetic coupling member 74. Second magnetic coupling member 74 and drive pulley 76 may be non-rotatably connected to each other by any means know in the art such as by means of screws, integrally forming the two units, an adhesive, spot welding or the like. In operation, when the rotation of shaft 82 terminates, the attractive and repulsive forces of the magnets will cause second magnetic coupling member 74 to rotate so that poles of reverse polarity are aligned into the orientation shown in FIG. 11. Accordingly, when motor 50 is energized and shaft 82 is rotated, rotation of first magnetic coupling member 72 will cause second magnetic coupling member 74 to rotate thereby causing drive pulley 76 to rotate.

An advantage of the instant invention is that by interspacing magnets having an outer pole of one polarity and magnets having an outer pole of the reverse polarity, relative motion of one coupling member against the other will occur if the moving member (e.g. brush 32) is free to rotate or move. Thus, the magnetic coupling members will align to complete the motive force transmission means between a drive means (e.g. and electric motor, air turbine, pneumatic air source or the like) and a moving member (e.g. a rotating brush for a vacuum cleaner or a reciprocating blade for a jig saw).

A further advantage of one aspect of this invention is that in situations where excessive torque is applied to the moving member (e.g. a brush jam situations occurs), the magnets will be realigned so as to repel each other will cause first and second magnetic coupling member 72, 74 to move apart. When the member 72, 74 move apart, the magnetic coupling which causes second magnetic drive member 74 to be driven by first magnetic coupling member 72 is interrupted thereby terminating movement of the driven moving member. As the motor shaft 82 continues to rotate, the relative radial motion of the magnets of first magnetic coupling member 72 with respect to the magnets of second magnetic coupling member 74 will eliminate or at least reduce the heating of first and second magnets 90, 92 due to a reduction or a cessation of the production of eddy currents that are produced by the alternating magnetic field produced by the relative motion of magnets 90, 92. Thus, if a brush jam situation or the like occurs, first and second magnets 90, 92 will not become irreparably damaged.

In vacuum cleaners having an above floor cleaning mode, it is desirable to ensure that brush 32 does not rotate while it is in contact with the surface on which surface cleaning head 12 is stationed when the surface cleaning apparatus 10 is used in the above floor cleaning mode. One method of achieving this result is to terminate rotation of brush 32 when the surface cleaning apparatus is in the above floor cleaning mode. Pursuant to another aspect of the instant invention, a magnetic clutch may be advantageously utilized to allow the rotation of brush 32 to be terminated while the surface cleaning apparatus is in the above floor cleaning mode. To this end, as shown in the embodiment of FIG. 3, motor 50 functions as both the drive motor for brush 32 as well as the suction motor for the vacuum cleaner. Accordingly, when motor 50 is energized, shafts 52 and 80 both rotate thus driving the brush 32 and producing suction. A brush brake 122 is provided which is movable between a first position distal to fan belt 78 and a second position in which brush brake 122 contacts fan belt 78. In particular, in the second position, bush brake 122 applies sufficient resistance to the travel of fan belt 78 so as to cause the magnetic coupling between magnetic coupling members 72, 74 to be lost thereby terminating the rotation of brush 32. Brush brake 122 may be manually engaged by a user (e.g. a foot petal or a button may be provided which, when depressed by a user, causes the brush brake to move to the second position and stop the movement of fan belt 78) Alternately, a mechanical coupling means 124 may be provided. Brush brake 122 applies indirect torque to the magnetic clutch to magnetically decouple the magnetic coupling members 72, 74. It will be appreciated, that brush brake 122 may directly apply torque to the magnetic clutch, preferably the driven magnetic coupling member.

Mechanical coupling member 124 may comprises a linkage extending between the extension hose used in the above floor cleaning mode and the brush brake of belt brake 122 so as to actuate the brush brake 122 when the vacuum cleaner is used in the above floor cleaning mode or, alternately, when the vacuum cleaner is moved to the above floor cleaning mode. For example, when the above floor cleaning hose is removed from its storage position in the vacuum cleaner, mechanical coupling means 124 could be used to actuate brush brake 122. Alternately, when the handle of the vacuum cleaner is positioned so that the above floor cleaning hose may be used (e.g. the handle is rotated to where it extends generally vertically from surface cleaning head 12 as shown in FIG. 1) mechanical coupling means 124 could be actuated to cause brush brake 122 to be actuated. As discussed previously with respect to FIGS. 3 and 4, valve 68 may also be automatically actuated when the handle is moved to the position shown in FIG. 1 or when the hose is removed from the storage position for use in an above floor cleaning mode.

In accordance with this method of operation, when motor 50 is energized, shaft 52 and shaft 82 will rotate causing fan blade 54 to draw air through socket 64, which is coupled, to the above floor cleaning hose. Simultaneously, the rotation of shaft 82 causes the rotation of first magnetic coupling member 72 which in turn attempts to cause matching rotation of second magnetic coupling member 74 because of the magnetic forces coupling second magnetic coupling member 74 to first magnetic coupling member 72. The rotation of second magnetic coupling member 74 is however inhibited by fan belt 78, which is prevented from moving by brush brake 122. The resulting torque applied to second magnetic coupling member 74 by the breaking of fan belt 78 will in turn cause first magnets 90 which are magnetically attracted to second magnets 92 to lose their radial alignment thereby causing first magnets 90 to face each and second magnets 92 face each other. The resulting magnetic repulsion will cause second magnetic coupling member 74 to move away from first magnetic coupling member 72 thereby breaking the magnetic coupling between members 72, 74. Thus, power is no longer delivered to brush 32 and the brush is effectively turned off. Furthermore, power delivery from motor 50 to brush 32 can not be restored until motor 50 is de-energized and the rotation of shaft 82 has stopped or substantially slowed. Thus, motor 50 can operate to create suction without brush 32 operating simultaneously.

In accordance with another embodiment of the instant invention, the rotation of the handle of surface cleaning apparatus 10 into the vertical position as shown in FIG. 1 may be used to both close passage 60 (such as by means of valve 68) and to engage brush brake 122 by means of, e.g. mechanical coupling means 124 while the removal of the above floor cleaning hose from a storage position can be used to cause passage 66 to be opened thereby drawing air for suction for fan 54 from the extension hose. In an alternate embodiment, a user may manually select an above floor cleaning mode by manually closing passage 60, manually engaging brush brake 122 and opening passage 66 to allow air to flow from the above floor cleaning hose to socket 64, through passage 66 to fan blade 54.

In accordance with a further alternate embodiment, passage 66 does not contain a valve. Instead, the rotation of the handle of surface cleaning apparatus 10 into the vertical position shown in FIG. 1 is utilized to close passage 60 and to engage brush brake 122 while the removal of the above floor cleaning hose from its storage position causes a valve which may be positioned at the mid point or end of the above cleaning hose to open thereby allowing air to be drawn through the above floor cleaning hose, through socket 64, through passage 66 to the suction produced by fan 54.

In accordance with a further alternate embodiment of the instant invention, passage 60 does not contain a valve. The rotation of the handle of surface cleaning apparatus 10 into the vertical position shown in FIG. 1 is used to close passage 60 and to engage brush brake 122 while a user manually actuates a valve in the mid-point or end of the above floor cleaning hose hereby allowing air to be drawn through socket 64, through passage 66 to the suction produced by fan 54. In a further alternate embodiment, the rotation of the handle of surface cleaning apparatus 10 into the vertical position shown in FIG. 1 may be used to close passage 60 and to engage brush brake 122 while a separate mechanism is used to close the end or a valve position in mid point of the above floor cleaning hose when the hose is not being used for cleaning.

Accordingly, the surface cleaning apparatus 10 is reconfigurable between a first and second position (e.g. an in use position in which the handle is rotated from the vertical position shown in FIG. 1 so that it may be used to move surface cleaning head 12 over a surface to be cleaned) and a second position (e.g. when the handle is in the vertical position shown in FIG. 1) and the brush brake is automatically engaged when the appliance is reconfigured from the first position to the second position. Any valving means know in the floor cleaning art may be used in place of valve 68.

It will be appreciated by those skilled in the art that various modifications and additions may be made to the appliances and/or the magnetic clutch disclosed herein and all of these are within the scope of the following claims. For example, it will be appreciated by one skilled in the art that rotary brush 32 may be replaced with an oscillating brush 32, which sweeps debris into dirt inlet 30.

The invention claimed is:

1. A surface cleaning head for a surface cleaning apparatus comprising:
   a) a bottom surface having a dirt inlet;
   b) a rotatable brush associated with the dirt inlet;
   c) a brush drive motor; and,
   d) a linkage drivingly connecting the motor to the rotatable brush, the linkage including first and second magnetic coupling members, each magnetic coupling member has
      a first surface which includes at least first and second magnets: and,
      each of the first and second magnets have an outer pole and the outer poles of each of the first magnets and the outer poles of each of the second magnets are of reverse polarity,
   wherein at least one of the first and second magnetic coupling members is moveably mounted with respect to the other of the first and second magnetic coupling members in a direction perpendicular to the first surfaces.

2. The surface cleaning head as claimed in claim 1 wherein each magnetic coupling member is provided with a sufficient number of first and second magnets such that the first magnets of the first coupling member can align with the second magnets of the second coupling member and the second magnets of the first coupling member can align with the first magnets of the second coupling member.

3. The surface cleaning head as claimed in claim 1 wherein the first magnetic coupling member has a similar number of first magnets as the second magnetic coupling member and the first magnetic coupling member has a similar number of second magnets as the second magnetic coupling member.

4. The surface cleaning head as claimed in claim 1 wherein each magnetic coupling member has at least two first magnets and at least two second magnets and the first and second magnets are positioned such that at least some of the first magnets are positioned between some of the second magnets.

5. The surface cleaning head as claimed in claim 1 wherein the first and second magnets are spaced apart in at least one line around the first surface of each magnetic coupling member and positioned in each line such that outer poles of one polarity are positioned between outer poles of the reverse polarity.

6. The surface cleaning head as claimed in claim 1 wherein each of the magnetic coupling members is mounted on a common shaft and the first magnetic coupling member is mounted to the shaft to rotate with the shaft and the second magnetic coupling member is freely rotatably positioned on the shaft.

7. The surface cleaning head as claimed in claim 6 wherein the brush drive motor has a brush drive motor shaft, which is the common shaft, the magnetic coupling members are provided on the brush drive motor shaft and the second magnetic coupling member is drivingly connected to the brush by a fan belt.

8. The surface cleaning head as claimed in claim 1 wherein each of the magnetic coupling members is mounted on the brush and the first magnetic coupling member is mounted to the brush to rotate with the brush and the second magnetic coupling member is freely rotatably positioned on the brush and drivenly connected to the brush drive motor by a fan belt.

9. The surface cleaning head as claimed in claim 1 further comprising a brake member which is engagable with at least one of the brush and the linkage to apply torque to the at least one of the brush and the linkage.

10. The surface cleaning head as claimed in claim 9 wherein the brake member is manually engagable by a user.

11. The surface cleaning head as claimed in claim 9 further comprising an upper portion pivotally connected to the surface cleaning head and an extension hose which is removable from a storage position on the upper portion for above floor cleaning and the brake member is automatically engaged when the hose is removed from the storage position.

12. A surface cleaning head for a surface cleaning apparatus comprising:
- a) a bottom surface having dirt inlet;
- b) a rotatable brush means associated with the dirt inlet;
- c) a brush drive motor; and,
- d) a linkage for drivingly connecting the motor to the rotatable brush, the linkage including first and second magnetic members for releasably drivingly coupling the first magnetic coupling member to the second magnetic coupling member, each of the first and second magnetic coupling members includes magnets that, in a first orientation, magnetically couple the magnetic coupling members such that rotation of the first magnetic coupling member will cause rotation of the second magnetic coupling member and, in a second orientation, the first and second magnetic coupling members will magnetically repel each other.

13. The surface cleaning head as claimed in claim 12 wherein at least one of the first and second magnetic coupling members is moveably mounted with respect to the other of the first and second magnetic members such that when the magnets are in the second orientation, the magnetic coupling members will move apart.

14. The surface cleaning head as claimed in claim 13 wherein each of the magnetic coupling members is mounted on a common shaft, which is the common shaft, and the first magnetic coupling member is mounted to the shaft to rotate with the shaft and the second magnetic coupling member is freely rotatably positioned on the shaft.

15. The surface cleaning head as claimed in claim 14 wherein the brush drive motor has a brush drive motor shaft, the magnetic coupling members are mounted on the brush drive motor shaft and the second magnetic coupling member is drivingly connected to the brush by a fan belt.

16. The surface cleaning head as claimed in claim 13 wherein each of the magnetic coupling members is mounted on the brush and the first magnetic coupling member is mounted to the brush to rotate with the brush and the second magnetic coupling member is drivenly connected to the brush drive motor by a fan belt.

17. The surface cleaning head as claimed in claim 13 further comprising a brake for applying torque to at least one of the magnetic coupling members to cause the magnets to move to the second orientation.

18. The surface cleaning head as claimed in claim 17 wherein the brake is manually engagable by a user.

19. The surface cleaning head as claimed in claim 17 further comprising an upper portion pivotally connected to the surface cleaning head and an extension hose which is removable from a storage position on the upper portion for above floor cleaning and the brake is automatically engaged when the hose is removed from the storage position.

20. A clutch comprising:
- a) a moving member;
- b) a drive motor;
- c) a linkage drivingly connecting the drive motor to the moving member, the linkage including first and second magnetic coupling; and,
- d) a brake member which is engagable to at least indirectly apply torque to the at least one of the magnetic coupling members.

21. The clutch as claimed in claim 20 wherein each magnetic coupling member has
- a) a first surface which includes at least first and second magnets; and,
- b) each of the first and second magnets have an outer pole and the outer poles of each of the first magnets and the outer poles of each of the second magnets are of reverse polarity, wherein at least one of the first and second magnetic coupling members is moveably mounted with respect to the other of the first and second magnetic coupling members in a direction perpendicular to the first surfaces.

22. The clutch as claimed in claim 20 wherein each magnetic coupling member is provided with a sufficient number of first and second magnets such that the first magnets of the first coupling member can align with the second magnets of the second coupling member and the second magnets of the first coupling member can align with the first magnets of the second coupling member.

23. The clutch as claimed in claim 20 wherein the first magnetic coupling member has a similar number of first magnets as the second magnetic coupling member and the first magnetic coupling member has a similar number of second magnets as the second magnetic coupling member.

24. The clutch as claimed in claim 20 wherein each magnetic coupling member has at least two first magnets and at least two second magnets and the first and second magnets are positioned such that at least some of the first magnets are positioned between some of the second magnets.

25. The clutch as claimed in claim 21 wherein the first and second magnets are spaced apart in at least one line around the first surface of each magnetic coupling member and positioned in each line such that outer poles of one polarity are positioned between outer poles of the reverse polarity.

26. The clutch as claimed in claim 20 wherein each of the magnetic coupling members is mounted on a common shaft and the first magnetic coupling member is mounted to the shaft to rotate with the shaft and the second magnetic coupling member is freely rotatably positioned on the shaft.

27. The clutch as claimed in claim 20 wherein the brake member is manually engagable by a user.

28. The clutch as claimed in claim 20 wherein the appliance is reconfigurable between at least two positions and the brake member is automatically engaged when the appliance is reconfigured.

29. The clutch as claimed in claim 20 wherein the clutch is provided in an appliance selected from the group consisting of a surface cleaning apparatus, a garden appliance and a power tool.

30. A clutch comprising:
- a) a moving member;
- b) a drive motor; and,
- c) a linkage for drivingly connecting the drive motor to the moving member, the linkage including first and second coupling magnetic members each of the first and second magnetic coupling members includes magnets that, in a first orientation, magnetically couple the magnetic coupling members such that rotation of the first magnetic coupling member will cause rotation of the second magnetic coupling member and, in a second orientation, the first and second magnetic coupling members will magnetically repel each other.

31. The clutch as claimed in claim 30 wherein at least one of the first and second magnetic coupling is moveably mounted with respect to the other of the first and second magnetic such that when the magnet are in the second orientation, the magnetic coupling means will move apart.

32. The clutch as claimed in claim 30 wherein each of the magnetic coupling members is mounted on a common shaft and the first magnetic coupling member is mounted to the shaft to rotate with the shaft and the second magnetic coupling member is freely rotatably positioned on the shaft.

33. The clutch as claimed in claim 30 further comprising a brake for applying torque to at least one of the magnetic coupling members to cause the magnets to move to the second orientation.

34. The clutch as claimed in claim 33 wherein the brake is manually engagable by a user.

35. The clutch as claimed in claim 30 further comprising a brake for applying torque to at least one of the magnetic coupling members to cause the magnets to move to the second orientation, wherein the appliance is reconfigurable between first and second positions and the brake is automatically engaged when the appliance is reconfigured.

36. The clutch as claimed in claim 30 wherein the clutch is provided in an appliance selected from the group consisting of a surface cleaning apparatus, a garden appliance and a power tool.

37. A surface cleaning head for a surface cleaning apparatus comprising:
   a) a bottom surface having a dirt inlet;
   b) a rotatable brush associated with the dirt inlet;
   c) a brush drive motor; and,
   d) a linkage drivingly connecting the motor to the rotatable brush, the linkage including first and second magnetic coupling members, each of the magnetic coupling members is mounted on a common shaft and the first magnetic coupling member is mounted to the shaft to rotate with the shaft and the second magnetic coupling member is freely rotatably positioned on the shaft.

38. The surface cleaning head as claimed in claim 37 wherein the brush drive motor has a brush drive motor shaft, which is the common shaft, the magnetic coupling members are provided on the brush drive motor shaft and the second magnetic coupling member is drivingly connected to the brush by a fan belt.

39. The surface cleaning head as claimed in claim 37 wherein each of the magnetic coupling members is mounted on the brush and the first magnetic coupling member is mounted to the brush to rotate with the brush and the second magnetic coupling member is freely rotatably positioned on the brush and drivenly connected to the brush drive motor by a fan belt.

40. The surface cleaning head as claimed in claim 37 further comprising a brake member which is engagable with at least one of the brush and the linkage to apply torque to the at least one of the brush and the linkage.

41. The surface cleaning head as claimed in claim 40 wherein the brake member is manually engagable by a user.

42. The surface cleaning head as claimed in claim 40 further comprising an upper portion pivotally connected to the surface cleaning head and an extension hose which is removable from a storage position on the upper portion for above floor cleaning and the brake member is automatically engaged when the hose is removed from the storage position.

43. A surface cleaning head for a surface cleaning apparatus comprising:
   a) a bottom surface having a dirt inlet;
   b) a rotatable brush associated with the dirt inlet;
   c) a brush drive motor; and,
   d) a linkage drivingly connecting the motor to the rotatable brush, the linkage including first and second magnetic coupling members, each of the magnetic coupling members is mounted on the brush and the first magnetic coupling member is mounted to the brush to rotate with the brush and the second magnetic coupling member is freely rotatably positioned on the brush and drivenly connected to the brush drive motor by a fan belt.

44. The surface cleaning head as claimed in claim 43 further comprising a brake member which is engagable with at least one of the brush and the linkage to apply torque to the at least one of the brush and the linkage.

45. The surface cleaning head as claimed in claim 44 wherein the brake member is manually engagable by a user.

46. The surface cleaning head as claimed in claim 44 further comprising an upper portion pivotally connected to the surface cleaning head and an extension hose which is removable from a storage position on the upper portion for above floor cleaning and the brake member is automatically engaged when the hose is removed from the storage position.

47. A surface cleaning head for a surface cleaning apparatus comprising:
   a) a bottom surface having a dirt inlet;
   b) a rotatable brush associated with the dirt inlet;
   c) a brush drive motor;
   d) a linkage drivingly connecting the motor to the rotatable brush, the linkage including first and second magnetic coupling members; and,
   e) a brake member which is engagable with at least one of the brush and the linkage to apply torque to the at least one of the brush and the linkage.

48. The surface cleaning head as claimed in claim 47 wherein the brake member is manually engagable by a user.

49. The surface cleaning head as claimed in claim 47 further comprising an upper portion pivotally connected to the surface cleaning head and an extension hose which is removable from a storage position on the upper portion for above floor cleaning and the brake member is automatically engaged when the hose is removed from the storage position.

* * * * *